May 4, 1937.  L. H. POLDERMAN  2,079,304
LEMON CONDITIONING AND RIND CURING SYSTEM
Filed Oct. 26, 1934  2 Sheets-Sheet 1
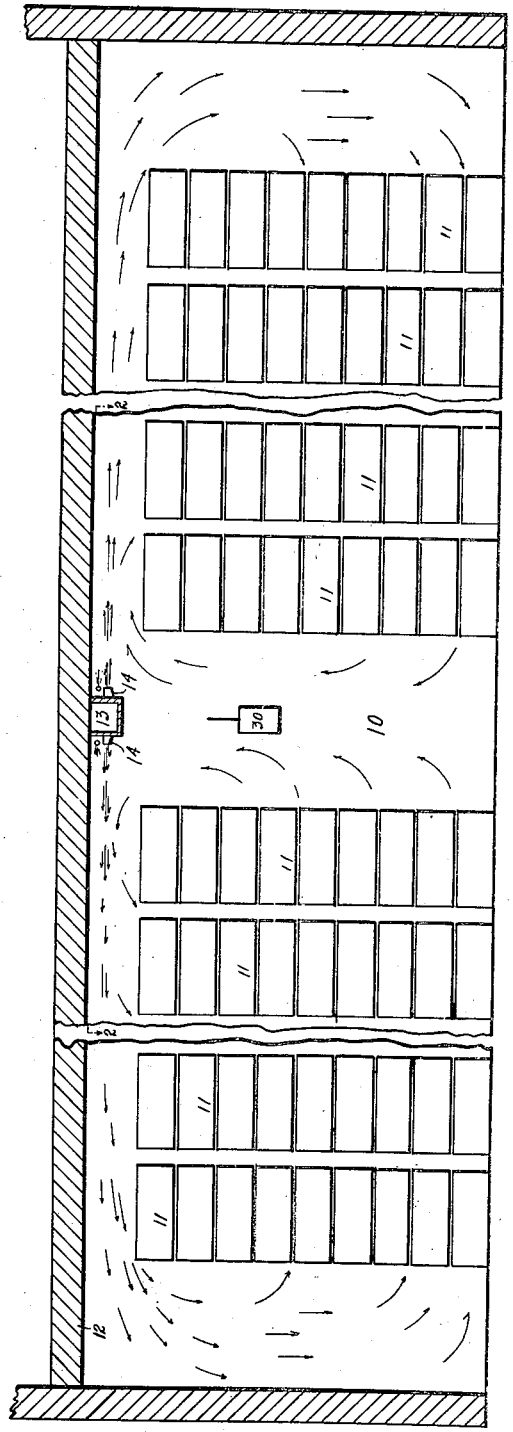
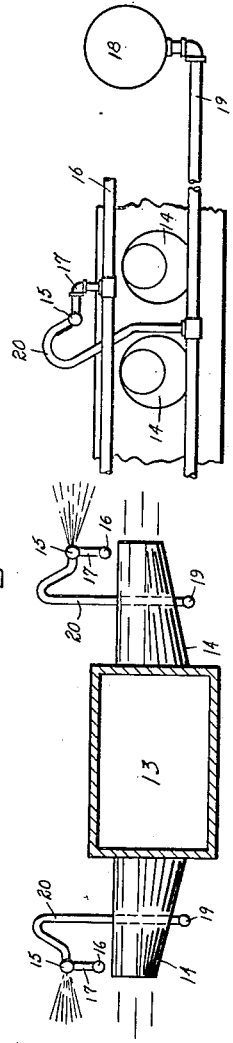
INVENTOR
LAMBERT H. POLDERMAN,
BY
ATTORNEY May 4, 1937. L. H. POLDERMAN 2,079,304
LEMON CONDITIONING AND RIND CURING SYSTEM
Filed Oct. 26, 1934 2 Sheets-Sheet 2
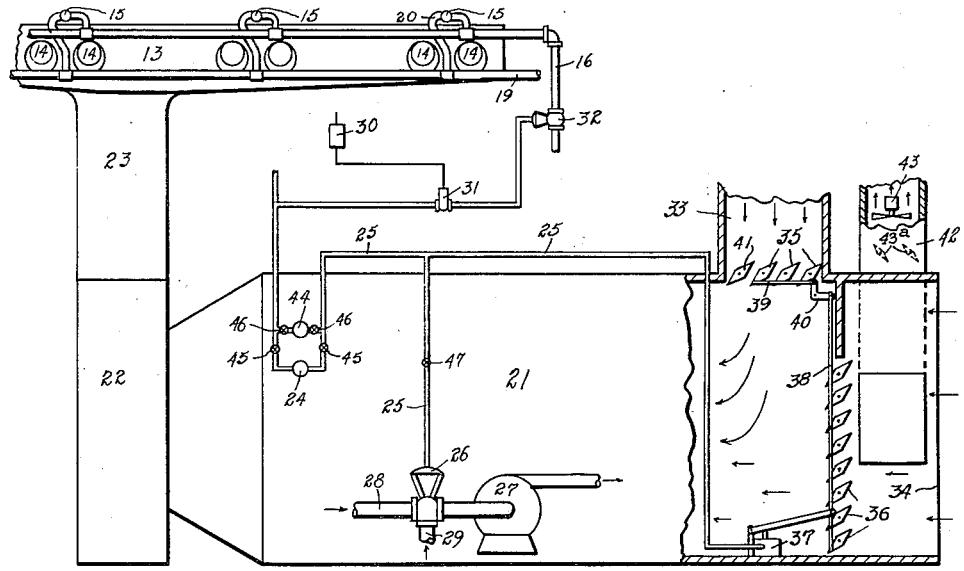
Fig-3-
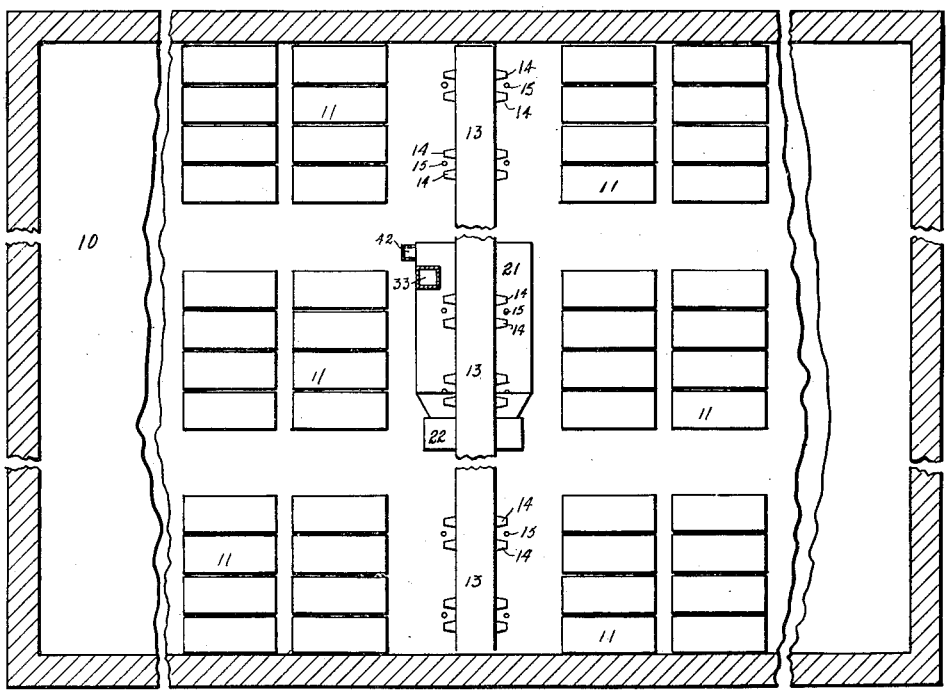
Fig-2-
INVENTOR
LAMBERT H. POLDERMAN,
BY Herman Feil
ATTORNEY Patented May 4, 1937

2,079,304

UNITED STATES PATENT OFFICE 2,079,304

LEMON CONDITIONING AND RIND CURING SYSTEM

Lambert H. Polderman, Los Angeles, Calif., assignor, by mesne assignments, to Carrier Corporation, Newark, N. J., a corporation of Delaware Application October 26, 1934, Serial No. 750,064

4 Claims. (Cl. 99—154)

This invention relates to the curing and storing of lemons.

It is the general practice of lemon growers to pick the fruit while it is still in a green condition, and after washing and preliminary grading, to place the fruit in storage for the purpose of curing, and also, for the purpose of holding it until there is a market demand. Curing is the term used to describe the gradual physical and chemical change which occurs when lemons are placed in an atmosphere the temperature, humidity and carbon dioxide content of which are controlled. During the process, the juice content of the lemons increases, the weight of the pulp and the rind decreases, and the color changes from green to a brilliant yellow. Further, the rind assumes a leathery condition and the waxy coating of the fruit increases. Consequently, the lemons are less subject to being bruised and damaged in transit from the storage point to the market.

In the curing process, the lemons absorb oxygen and give off carbon dioxide and other gases, a process which is termed respiration. The other gases above referred to have been found to have a very deleterious effect on the keeping quality of the lemons. Hence, it is desirable to control this gaseous content. Experimental results show that the other gases are always present in direct proportion to the carbon dioxide content in the atmosphere surrounding the fruit. Thus, by controlling the carbon dioxide content of the air, the presence of these undesirable gases can be controlled.

The efficacy of the curing and respiration processes have been found to depend upon temperature, relative humidity and air motion to which the lemons are subjected.

The general object of the invention is to provide a curing process in which the decay and shrinkage of fruit is reduced to a minimum and the percentage of sound fruit resulting from the process is markedly increased.

It is another object of the invention to improve the general quality of the fruit resulting from storage, to improve the color of the fruit and to increase its vitality and resistance to bruising and damage in handling.

It is another object of the invention to provide means for controlling the temperature and humidity of an atmosphere surrounding the fruit and to control the carbon dioxide and other gaseous content of the atmosphere.

It is a further object of the invention to utilize conditioned air to cure lemons; and to control the relative humidity of this air at a very high value, whereby the loss of weight of the lemons during the curing process will be controlled and the rind caused desirably to change in character and color.

Still a further object of the invention is to maintain a movement of conditioned air throughout the room, to remove gas exuded from the lemons, the circulation causing the temperature and humidity conditions to be the same at every point in the room, thus to insure a uniformity of high quality cured lemons.

A feature of the invention resides in placing lemons in an insulated storage room, discharging a relatively small volume of intensively conditioned air into the room whereby a relatively large secondary circulation of air is induced through and over the fruit and discharging free moisture into the room to prevent a decrease in the relative humidity in the air.

Another feature of the invention resides in discharging the air in a plurality of relatively small streams and discharging the free moisture above the point of air discharge whereby the streams of air support the moisture until it can be absorbed by the air.

Another feature of the invention resides in supplying to the room a constant volume of outside air and discharging or relieving from the room a corresponding volume of vitiated air whereby the carbon dioxide and other gaseous content of the atmosphere may be controlled.

Another feature of the invention resides in utilizing a plurality of high velocity streams of air, discharged into the storage room above the lemons, to induce a secondary circulation of air at a relatively low velocity over and in contact with the lemons.

Other objects and features making for efficiency and economy will be more apparent from the following description and drawings, in which:

Fig. 1 is a fragmentary elevational view, partly in section, of a lemon storage room showing the distribution of air therein, certain elements being omitted;

Fig. 2 is a fragmentary plan view of the room shown in Fig. 1;

Fig. 3 is an elevational view of an air conditioning unit, part of the casing being broken away to show the interior thereof, for supplying air to a distributing means;

Fig. 4 is an elevational view, partly in section, of the air and water distributing means; and Fig. 5 is an elevational view of a fragment of the air and water distributing means.

In the drawings, similar designations referring to similar parts, with particular reference to Fig. 1, numeral 10 designates generally the basement of a building which is being used as a lemon storage room. Positioned within the room are a large number of boxes of lemons 11 which are to be cured. As can be seen, the boxes are stacked to within a short distance of the ceiling 12; and the stacks are placed relatively close together. An air distributing conduit 13 is mounted on the ceiling 12 and for reasons hereinafter to appear, the space directly beneath the conduit is not filled with lemon boxes. A plurality of tapered nozzles 14 are mounted on the opposite sides of the conduit 13 for the purpose of discharging conditioned air in a plurality of high velocity streams into the space between the tops of the stacks and the ceiling 12. As can be seen from Figs. 3 and 5, the nozzles 14 are mounted at spaced points along the length of the conduit 13, a pair of nozzles being provided at each point. Above each pair of nozzles a water atomizing jet 15 is placed. The jets 15 are of usual atomizing type, that is, air supplied to each nozzle through pipe 16, and branch pipe 17, induces a flow of water from tank 18 through pipe 19, and branch pipe 20, the water being atomized and discharges it in the form of a very fine mist. To prevent discharge of water from a jet when no air is being supplied through pipe 16, the level of water in the branch pipe 20 is maintained at a point several inches below the level of the jet 15. To this end, the tank 18 may be provided with any type of usual float control.

Fig. 3 illustrates, in a more or less diagrammatic manner, a conditioning unit 21 for supplying air to the conduit 13. The conditioning unit may be placed at any desired point within the basement, or, if desired, it may be placed outside of the basement. A fan 22 is adapted to draw a volume of air through a bank of sprays within the unit and to discharge this air into the conduit 13 through branch conduit 23. The temperature of the spray bank is controlled at a desired point whereby the dewpoint temperature of the air discharged by the fan 22 may be controlled. To this end, thermostat 24, the thermosensitive element of which is mounted within the conditioning unit 21, controls the supply of compressed air from any desired source through pipe 25 to the diaphragm of the three-way valve 26 of common construction. A pump 27 intakes a mixture of cold water from a refrigerating machine, for example, through pipe 28, and warm water through pipe 29 from the sump of the unit 21, the relative proportions of cold and warm water being determined by the setting of a valve 26. Thus, the temperature of the spray water, consequently the temperature of the air passing therethrough, may be controlled. This type of dewpoint control is well known in the art, and hence, further explanation and illustration is believed unnecessary.

In practice, it has been found that the temperature at which lemons cure most effectively is about 52 to 60 degrees F. and that the loss of weight and rind conditioning is best controlled and accomplished when the relative humidity in the room is 90 per cent or more within said temperature range. Therefore, the thermostat 24 may be set to maintain a dewpoint temperature of substantially 52 degrees, for example. Thus, the air discharge from conduit 13 through nozzles 14 into the room will be substantially saturated at 52 degrees. The high velocity streams of air discharged from the nozzles will carry substantially the entire length of the room without descending towards the floor. Further, and more important, these high velocity streams of air will entrain with themselves the air within the room and induce a secondary circulation of air through and around the boxes of lemons 11. The air which contacts the lemons will, of course, absorb the heat resulting from the respiration process; and likewise, the movement of air over the lemons will displace the carbon dioxide and other gases produced. The absorbed heat will tend to raise the temperature of the air and reduce its relative humidity. Theoretically, this heat will raise the temperature of the air to 55 degrees from 52 degrees and reduce its relative humidity to 90 per cent. However, a slight variation in temperature from the desired point will effect a change in the relative humidity; and practice has shown that a reduction of relative humidity below 88 per cent with the air circulating rapidly as hereinbefore described is accompanied by detrimental results. In one experiment in which one batch of lemons was kept in an atmosphere at 90 per cent relative humidity, and another in an atmosphere having a relative humidity of 86.7 per cent the lemons in the second atmosphere lost approximately twice as much weight as those in the first atmosphere over an eleven week storage period. To insure a relative humidity of 90 per cent or better, applicant provides the water jets 15 hereinbefore described. A hygrostat 30 which may be of any usual type, controls the operation of solenoid valve 31. When the humidity within the room drops below a desired point, 88 per cent for example, the valve 31 is opened to admit compressed air to the diaphragm valve 32 which thereupon opens and admits air through pipe 16 to the water jets 15. Consequently, a volume of water is withdrawn from pipe 19 and discharged into the room in the form of a very fine mist. Since the air in the room is at a very high humidity, i. e., very nearly saturated, it will not readily take up more moisture. Unless this moisture is supported in the air for a sufficient length of time to be absorbed, it will descend and collect upon the surfaces of the lemons. This would be highly undesirable as it would promote mold growth and tend to spot the lemons. Hence, each of the water jets 15 is mounted directly above a pair of nozzles 14. Consequently, the stream of air discharging from the nozzles at high velocity tends to entrain this water within itself and support the water against the force of gravity until it is evaporated; thus preventing its descent and collection on the lemons. The relative humidity of the air is thereby increased to the desired point. If the relative humidity rises above a desired value, for example, 93 per cent., the hygrostat will act to close the valve 31, thus to close valve 32 and to discontinue the spraying of moisture from the jets 15. In this manner, the temperature of the lemons is maintained at the desired point and at the same time, a very high humidity is maintained throughout the room.

While the circulation of air over the lemons displaces the carbon dioxide and other gases and moves them away from the lemons, it is apparent that unless some of this air is discharged from the room, there will be a gradual and constant accumulation of gas which no amount of circulation can overcome. In other words, it is necessary to introduce some outside air into the room 10, and at the same time to exhaust or relieve a portion of the air from the room. To this end, applicant provides an outside air conduit 33 leading to the inlet side of the unit 21, and a recirculated air opening 34. A plurality of dampers 35 cover the face area of the conduit 33, while another set of dampers 36 cover the face area of the opening 34. An air motor 37 of the usual diaphragm construction, is attached to the dampers 36 through rod 38. A rod 39 which is attached to a portion of the dampers 35 connects through bell crank 40 with the rod 38. The air motor 37 is controlled by thermostat 24 in such a manner that, under summer operating conditions, when the temperature of air within the unit 21 rises, the air pressure exerted on the motor 37 is increased, thus to open dampers 36, whereby a larger proportion of return air is sent to the conditioner through opening 34; and simultaneously to close the dampers 35 to reduce the amount of outside air which is being intaken. If it is desired to provide a minimum quantity of fresh air at all times, one portion of the outside air dampers 41 is not attached to rod 39, but is set at a fixed point. Then, regardless of whether the dampers 35 are open or closed, some fresh air will always be admitted through that part of the outside air conduit which is controlled by damper 41. An exhaust conduit 42 is provided proximate the inlet side of the conditioning unit 21; and an exhaust fan 43 may be provided to withdraw a portion of the air from the room, and discharges it through this conduit to any desired point. As an alternative air relief arrangement, a common relief damper 43a may be provided to allow an out-flow of air. With either arrangement, air may be relieved from the room, thus preventing an accumulation of carbon dioxide and other deleterious gases. The temperature control hereinbefore described is designed for summer operation, that is, when refrigeration of any sort is required. In the winter time, the outside air may be sufficiently low in temperature to maintain the temperature of the room at the desired point. A thermostat 44, of the reverse acting type, is provided to shift from summer to winter control. It is only necessary to close off the hand cocks 45, to open the hand cocks 46, and to close the hand cock 47. Then, under winter operating conditions, when the temperature of air in unit 21 increases, thermostat 44 acts to reduce the pressure of air in the pipe 25 and hence, to reduce the pressure of air on the diaphragm motor 37. Relieving the pressure on motor 37 results in the closing of dampers 36 and the opening of dampers 35, thus to admit more cold air from the outside, and to reduce the amount of air returned from the room through opening 34. Consequently, the temperature of the air passing through the unit will be reduced. Conversely, if the temperature in the unit 21 falls below the desired point, thermostat 44 acts to increase the air pressure on diaphragm motor 37, thus to close dampers 35 and to open dampers 36, whereupon less outside air will be admitted and the cooling effect reduced. The operation of the hygrostat 30 to control the discharge of free moisture into the room through nozzles 15 is the same both in summer and in winter.

Since certain changes in carrying out the above process and in the constructions set forth, which embody the invention may be made without departing from its scope, it is intended that all matter contained in the above description or shown in the accompanying drawings shall be interpreted as illustrative and not in a limiting sense.

I claim:

1. A method of curing lemons which comprises placing the lemons in an enclosure, maintaining the temperature within the enclosure in a range between 52 and 60 degrees F., maintaining the relative humidity in the enclosure in a range between 88–93 per cent and controlling the carbon dioxide content in the enclosure by causing a movement of conditioned air over the lemons to maintain the atmosphere in a condition suitable for development of desirable physical properties of the lemons.

2. The method of curing lemons which includes placing them in an enclosure, relieving from the enclosure quantities of vitiated air and replacing said relieved air with substantially equal quantities of air from outdoors, conditioning the outdoor air and air from the enclosure to maintain a temperature in the enclosure between 52 and 60 degrees F. at a relative humidity between 88 and 93 per cent., regulating the carbon dioxide content in the air by controlling the volumes of air intaken to and relieved from the enclosure, and maintaining a circulation of the air in the enclosure to effect wiping away of the carbon dioxide produced at the surface of the lemons.

3. A method of curing lemons which comprises placing them in a storage area, relieving from the area quantities of vitiated air and replacing said relieved air with substantially equal quantities of air from outside the area, maintaining atmospheric conditions within the area higher than 51 degrees and lower than 61 degrees F., at a relative humidity higher than 87 and lower than 94 per cent, controlling the carbon dioxide content in the air by controlling the volumes of air intaken to and relieved from the enclosure, and maintaining an active circulation in the area by discharging small streams of air at relatively high velocity for the purpose of inducing a large secondary circulation in the area for wiping away heat of respiration and gases exuded by the lemons and maintaining conditions of temperature throughout the storage area substantially constant.

4. A method of curing lemons which consists in placing the lemons in an enclosure, maintaining an active circulation of air within the enclosure, and maintaining in the enclosure a temperature higher than 51° F. and lower than 61° F. and a relative humidity higher than 87%, and lower than 94%.

LAMBERT H. POLDERMAN.